United States Patent
Torvinen et al.

(10) Patent No.: US 11,917,073 B2
(45) Date of Patent: *Feb. 27, 2024

(54) INTEGRITY PROTECTION

(71) Applicant: Telefonaktiebolaget LM Ericsson (publ), Stockholm (SE)

(72) Inventors: Vesa Torvinen, Sauvo (FI); Noamen Ben Henda, Stockholm (SE); Qian Chen, Mölndal (SE); Vesa Lehtovirta, Espoo (FI); Mats Näslund, Bromma (SE); Karl Norrman, Stockholm (SE); Gang Ren, Shanghai (CN); Mikael Wass, Sätila (SE); Monica Wifvesson, Sätila (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 39 days.

This patent is subject to a terminal disclaimer.

(21) Appl. No.: 17/706,774

(22) Filed: Mar. 29, 2022

(65) Prior Publication Data
US 2022/0224543 A1  Jul. 14, 2022

Related U.S. Application Data

(63) Continuation of application No. 16/070,216, filed as application No. PCT/EP2016/078652 on Nov. 24, 2016, now Pat. No. 11,296,890.
(Continued)

(51) Int. Cl.
*H04L 9/32* (2006.01)
*H04L 9/06* (2006.01)
(Continued)

(52) U.S. Cl.
CPC .......... *H04L 9/3242* (2013.01); *H04L 9/0618* (2013.01); *H04L 9/0869* (2013.01);
(Continued)

(58) Field of Classification Search
CPC ... H04L 9/3242; H04L 9/0618; H04L 9/0869; H04L 2209/04; H04W 12/041; H04W 12/106; G16Y 10/75; G16Y 40/50
See application file for complete search history.

(56) References Cited

U.S. PATENT DOCUMENTS

| | | |
|---|---|---|
| 5,987,137 A | 11/1999 | Karppanen et al. |
| 6,711,400 B1 | 3/2004 | Aura |
(Continued)

FOREIGN PATENT DOCUMENTS

| | | |
|---|---|---|
| EP | 1615370 | 1/2006 |
| EP | 2073430 | 6/2009 |
(Continued)

OTHER PUBLICATIONS

Digital cellular telecommunications system (Phase 2+); General Packet Radio Service (GPRS); Mobile Station—Serving GPRS Support Node (MS-SGSN) Logical Link Control (LLC) layer Specification, ETSI, GSM 04.64 version 6.1.0 Release 1997, pp. 11, 16, 29, 52-53 (Year: 1998).
(Continued)

*Primary Examiner* — Chau Le
(74) *Attorney, Agent, or Firm* — Rothwell, Figg, Ernst & Manbeck, P.C.

(57) ABSTRACT

A message authentication code, for a message transmitted and received over a communications network, is formed by applying inputs to an integrity algorithm acting on the message. The inputs comprise: an integrity key; a value indicating a transfer direction; and a frame-dependent integrity input, wherein the frame-dependent integrity input is a frame-dependent modulo count value that also depends on a random value and on a frame-specific sequence number.

25 Claims, 10 Drawing Sheets

Related U.S. Application Data

(60) Provisional application No. 62/278,123, filed on Jan. 13, 2016.

(51) Int. Cl.

| | | |
|---|---|---|
| *H04L 9/08* | (2006.01) | |
| *H04W 12/041* | (2021.01) | |
| *H04W 12/106* | (2021.01) | |
| *G16Y 40/50* | (2020.01) | |
| *G16Y 10/75* | (2020.01) | |

(52) U.S. Cl.
CPC ....... *H04W 12/041* (2021.01); *H04W 12/106* (2021.01); *G16Y 10/75* (2020.01); *G16Y 40/50* (2020.01); *H04L 2209/04* (2013.01)

(56) References Cited

U.S. PATENT DOCUMENTS

| | | | |
|---|---|---|---|
| 8,090,098 B2 | 1/2012 | Kim | |
| 8,102,999 B2 | 1/2012 | Corndorf | |
| 8,418,235 B2 | 4/2013 | Sherkin | |
| 8,605,904 B2 | 12/2013 | Lin | |
| 8,627,092 B2 * | 1/2014 | Fischer | H04W 12/06 713/168 |
| 8,862,880 B2 | 10/2014 | Combet | |
| 9,043,876 B2 * | 5/2015 | Struik | H04L 9/0618 726/3 |
| 2002/0044552 A1 | 4/2002 | Vialen | |
| 2002/0066011 A1 | 5/2002 | Vialen et al. | |
| 2005/0033960 A1 | 2/2005 | Vialen | |
| 2010/0131756 A1 | 5/2010 | Schneider | |
| 2011/0051927 A1 | 3/2011 | Murray | |
| 2013/0195266 A1 | 8/2013 | Fischer | |
| 2017/0366354 A1 * | 12/2017 | Alomair | H04L 9/3242 |
| 2019/0080059 A1 * | 3/2019 | Takumi | G06F 21/44 |
| 2019/0223022 A1 * | 7/2019 | Torvinen | H04W 12/106 |
| 2020/0322160 A1 * | 10/2020 | Torvinen | H04W 12/106 |

FOREIGN PATENT DOCUMENTS

| | | |
|---|---|---|
| JP | H10-66157 | 3/1998 |
| JP | 2003-524353 | 8/2003 |
| JP | 2004-515177 | 5/2004 |
| JP | 2004-185170 | 7/2004 |
| WO | 01/63954 | 8/2001 |
| WO | 2013/175539 | 11/2013 |

OTHER PUBLICATIONS

Muxiang Zhang, Security Analysis and Enhancements of 3GPP Authentication and Key Agreement Protocol, Mar. 2005, IEEE Transactions on Wireless Communications, vol. 4, pp. 736-738 (Year: 2005).

Universal Mobile Telecommunications System (UMTS) LTE Cryptographic algorithm requirements, ETSI, 3GPP TS 33.105 version 9.0.0 Release 9, pp. 6-22 (Year: 2010).

Koien et al., An Introduction to Access Security in UMTS, IEEE Wireless Communications, pp. 1-11 (Year: 2004).

Notice of Reasons for Refusal dated Aug. 6, 2019 issued in Japanese Patent Application No. 2018-536440 with partial translation. (13 pages).

3GPP TS 35.201 V12.0.0 (Sep. 2014); 3rd Generation Partnership Project; Technical Specification Group Services and System Aspects; 3G Security; Specification of the 3GPP Confidentiality and Integrity Algorithms; Document 1: f8 and f9 Specification (Release 12) (Sep. 2014). (22 pages).

Davies, D.W and Price, W.L., "Network Security", Nikkei McGraw Hill, Dec. 5, 1985, pp. 123-125.

International Search Report and Written Opinion dated Feb. 13, 2017 issued in International Patent Application No. PCT/EP2016/078652. (10 pages).

3GPP TR 33.860 V1.0.0 , 3rd Generation Partnership Project; Technical Specification Group Services and System Aspects; "Study on EGPRS Access Security Enhancements with relation to cellular IoT" (Release 13); (Dec. 2015). (35 pages).

3GPP TR 33.863 V0.4.0, 3rd Generation Partnership Project; Technical Specification Group Services and System Aspects; "Study on battery efficient security for very low throughput Machine Type Communication Devices" (Release 13); (Nov. 2015). (46 pages).

3GPP TR 43.869 V13.0.0, 3rd Generation Partnership Project; Technical Specification Group GSM/EDGE Radio Access Network; "Study on power saving for Machine-Type Communication (MTC) devices" (Release 13); (Aug. 2015). (35 pages).

3GPP TS 24.008 V13.4.0, 3rd Generation Partnership Project; Technical Specification Group Core Network and Terminals; "Mobile radio interface Layer 3 specification"; Core network protocols; Stage 3 (Release 13); (Dec. 2015). (733 pages).

3GPP TS 44.064 V13.0.0, 3rd Generation Partnership Project; Technical Specification Group Core Network and Terminals; "Mobile Station—Serving GPRS Support Node (MS-SGSN)"; Logical Link Control (LLC) layer specification (Release 13); (Dec. 2015). (64 pages).

Tdoc SP-150718, SA3, "Presentation of Study on EGPRS Access Security Enhancements with relation to cellular IoT to TSG SA", 3GPP TSG-SA Meeting #70, Sitges, Spain (Dec. 9-11, 2015). (1 page).

* cited by examiner

INTEGRITY PROTECTION

CROSS REFERENCE TO RELATED APPLICATION(S)

This application is a continuation of U.S. application Ser. No. 16/070,216, filed Jul. 13, 2018, which is the 35 U.S.C. § 371 National Stage of International Patent Application No. PCT/EP2016/078652, filed Nov. 24, 2016, which claims priority to U.S. provisional application No. 62/278,123, filed on Jan. 13, 2016. The above identified applications are incorporated by reference.

TECHNICAL FIELD

This invention relates to a method of operation of a terminal device and a network node in a cellular communications network.

BACKGROUND

The Cellular Internet of Things (CIoT) is a new radio technology that is able to provide extended coverage for harsh environments, for example, basements, and is designed to serve massive number of UEs (over 50,000 per base station) using a very limited bandwidth (e.g. 160 bps).

The current assumption in 3GPP standardization is that the security mechanism for CIoT over GSM EDGE Radio Access Network (GERAN) would be based on enhancements of General Packet Radio Service (GPRS) security as introducing integrity protection for the control plane in Gb mode between the CIoT user equipment and the Serving GPRS Support Node (SGSN).

The assumption for CIoT is that the Universal Mobile Telecommunications System (UMTS) Authentication and Key Agreement (AKA) is run at the GPRS Mobility Management and Session Management (GMM/SM) layer creating the keying material, and the integrity protection is done at the Logical Link Control (LLC) layer using the integrity key (Kti128) created with the key derivation function from the UMTS AKA session keys.

SUMMARY

According to the present invention there is provided a method of forming a message authentication code for a message transmitted and received over a communications network. The method comprises applying inputs to an integrity algorithm acting on the message. The inputs comprise: an integrity key; a value indicating a transfer direction; and a frame-dependent integrity input, wherein the frame-dependent integrity input is a frame-dependent modulo count value that also depends on a random value and on a frame-specific sequence number.

According to the present invention there is provided a method of providing protection for a message transmitted and received over a communications network. The method comprises: applying an output of a ciphering algorithm to the message, wherein the ciphering algorithm uses a ciphering input value that is obtained from a first random value by means of an input generation algorithm, and providing integrity protection by applying an integrity algorithm to the message to form a message authentication code for the message, wherein the integrity algorithm uses an integrity input value that is obtained from a second random value by means of said input generation algorithm.

According to the present invention there is provided a device or node for use in a communications network, the device or node being configured for forming a message authentication code by either of the previous methods.

According to the present invention there is provided a device or node for use in a communications network, the device or node terminal device comprising a processor and a memory, the memory containing instructions executable by the processor, such that the terminal device is operable to carry out either of the previous methods.

According to the present invention there is provided a computer program configured, when run on a computer, to carry out either of the previous methods. According to the present invention there is provided a computer program product comprising a computer readable medium and such a computer program.

Thus, embodiments of the invention allow for integrity protection of control messages.

DETAILED DESCRIPTION

Figure 1:
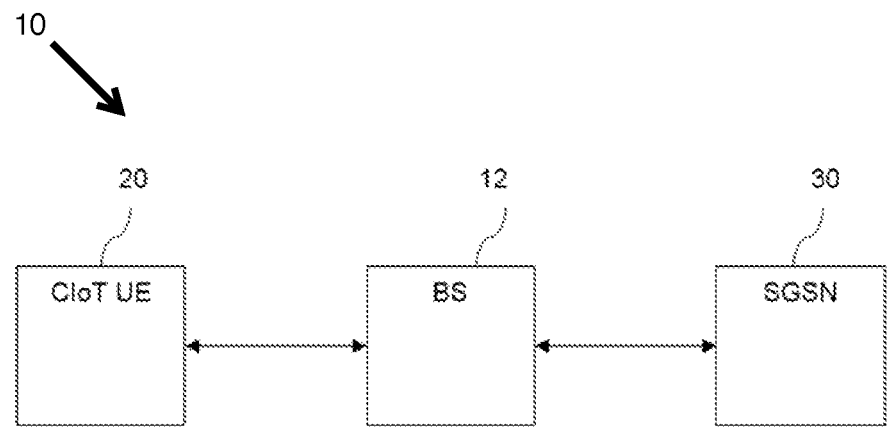
FIG. 1 illustrates a part of a cellular communications network.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not to obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, IEEE 802.11 or 802.16, etc.

A cell is associated with a base station, where a base station comprises in a general sense any network node transmitting radio signals in the downlink (DL) and/or receiving radio signals in the uplink (UL). Some example base stations, or terms used for describing base stations, are eNodeB, eNB, NodeB, macro/micro/pico/femto radio base station, home eNodeB (also known as femto base station), relay, repeater, sensor, transmitting-only radio nodes or receiving-only radio nodes, or WLAN access point (AP). A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

FIG. 1 illustrates a part of a network 10. The network 10 comprises a basestation 12 connected to a Cellular Internet of Things (CIoT) terminal device (UE) 20 and a network node. In illustrated embodiments, the network node is a Serving GPRS Support Node (SGSN) 30. Of course, a network will typically include many basestations, and a very large number of terminal devices, but the present FIG. 1 is sufficient for an understanding of the present invention. The terminal device may be a user equipment device or may be a device that connects automatically to the network as required, and may be fixed or portable. The terms user equipment (UE) and mobile station (MS) are both used herein to refer to the terminal device.

Figure 2:
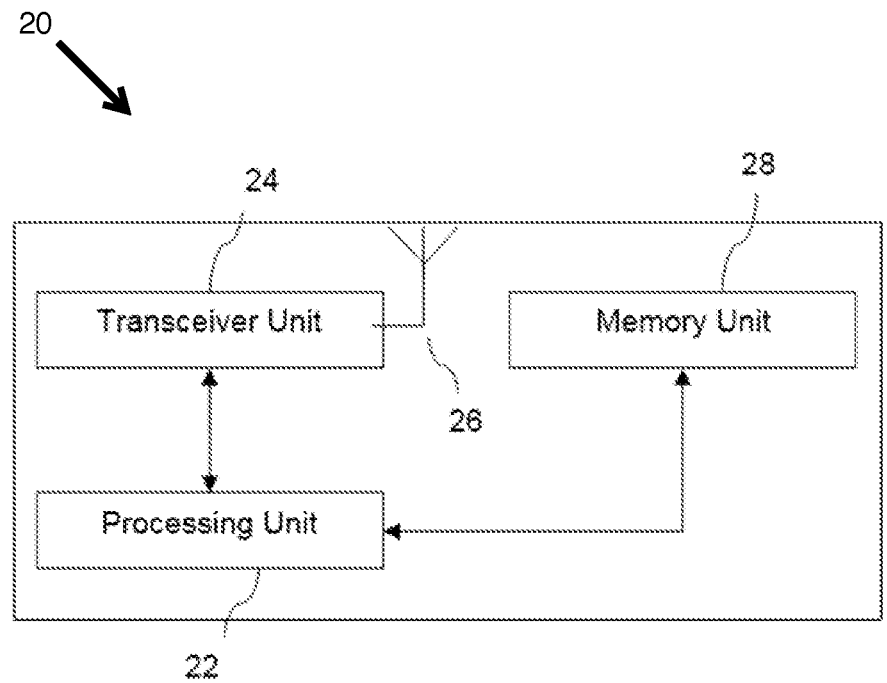
FIG. 2 illustrates a terminal device in the network of FIG. 1.

FIG. 2 shows a terminal device (UE) 20 that can be adapted or configured to operate according to one or more of the non-limiting example embodiments described. The UE 20 comprises a processor or processing unit 22 that controls the operation of the UE 20. The processing unit 22 is connected to a transceiver unit 24 (which comprises a receiver and a transmitter) with associated antenna(s) 26 which are used to transmit signals to and receive signals from a base station 12 in the network 10. The UE 20 also comprises a memory or memory unit 28 that is connected to the processing unit 22 and that contains instructions or computer code executable by the processing unit 22 and other information or data required for the operation of the UE 20 in accordance with the methods described herein. The terminal device is also referred to herein as a mobile station (MS).

Figure 3:
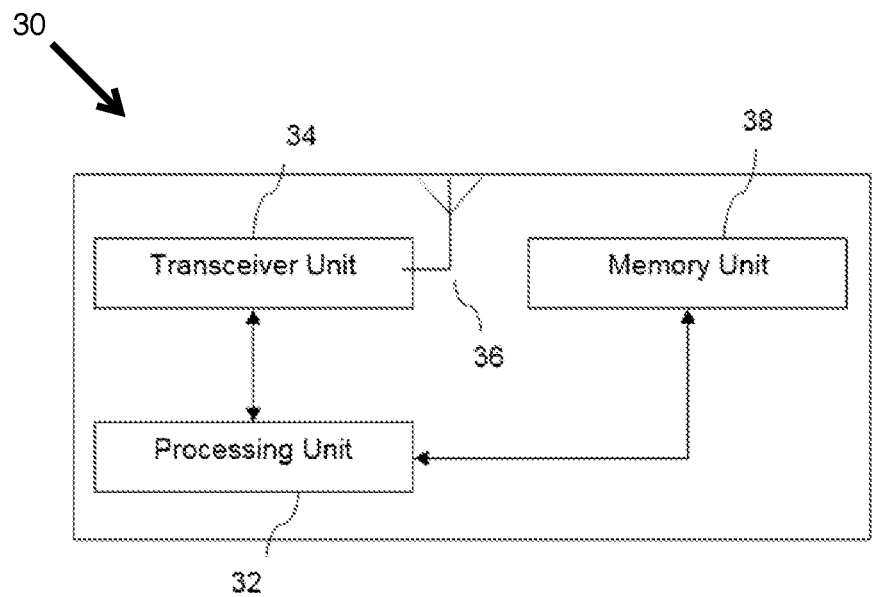
FIG. 3 illustrates a network node in the network of FIG. 1.

FIG. 3 shows a Serving GPRS Support Node (SGSN) 30 that can be adapted or configured to operate according to one or more of the non-limiting example embodiments described. The SGSN 30 comprises a processor or processing unit 32 that controls the operation of the SGSN 30. The processing unit 32 is connected to a transceiver unit 34 (which comprises a receiver and a transmitter) with associated antenna(s) 36 which are used to transmit signals to and receive signals from terminal device(s) 20, via basestations 12 in the network 10. The SGSN 30 also comprises a memory or memory unit 38 that is connected to the processing unit 32 and that contains instructions or computer code executable by the processing unit 32 and other information or data required for the operation of the SGSN 30 in accordance with the methods described herein.

Encryption (also known as ciphering) of control signaling and user plane data is optional in the 2G General Packet Radio Service (GPRS). Also, integrity protection is not provided. This causes several potential security issues that are more problematic in the context of the Cellular Internet of Things (CIoT) than in the normal GSM/GPRS context. For example, there is a problem of a "bidding down" attack which could potentially allow an attacker to turn off the encryption. This may lead to a problem of the loss of confidentiality but also more severe problems, such as allowing an attacker to detach the CIoT UE from the network, and in this way leaving the CIoT UE without network connection. The CIoT UE would need to recover from such situation without human assistance. There is also a risk that the CIoT UE may be tricked to perform a Denial of Service attack towards the network if security enhancements are not specified. Furthermore, the attacker could potentially force the CIoT UE and the network to run authentication more frequently than necessary and in this way consume the battery of the CIoT UE.

One solution to these issues is therefore to introduce integrity protection. Integrity protection could be supported by the LLC layer in order to be able to integrity protect layer 3 control signaling messages such as for example GMM messages, SM messages, Short Message Service (SMS), and user plane data.

In order to provide integrity protection, the CIoT UE and SGSN may negotiate which integrity algorithm and encryption algorithm to use for security protection of layer 3 signaling information and user plane data when the CIoT UE initiates GMM Attach procedure in order to register in the 3GPP network. The CIoT UE may therefore send the identifiers of the supported integrity protection algorithms together with the supported encryption algorithms to the SGSN in its security capability indication (CIoT UE's security capabilities), when it attaches to the network and initiates a GMM Attach Request message. The CIoT UE's security capabilities could be indicated for example in 'MS network capability' or in a new UE capability indication.

In order that the GMM Attach Request message can be protected between the CIoT UE and the SGSN, it is proposed that the SGSN should echo the CIoT UE's security capabilities received in GMM Attach Request message, back to the CIoT UE in an integrity protected GMM message (e.g. GMM Authentication and Ciphering Request message or any new GMM message), so that the CIoT UE is able to check if the received CIoT UE's security capabilities matches with the CIoT UE's security capability it sent in GMM Attach Request message to the SGSN, in order to conclude that no bidding down attack has taken place. This is similar to what is done in the existing protocols for 3G/UMTS and LTE.

The SGSN also selects a common encryption algorithm and a common integrity protection algorithm based on the support algorithms indicated in CIoT UE's security capabilities from CIoT UE in GMM Attach Request message. Therefore the SGSN can indicate the selected algorithms in an integrity protected GMM message (e.g. GMM Authentication and Ciphering Request message or any new GMM message) to the CIoT UE.

Figure 4:
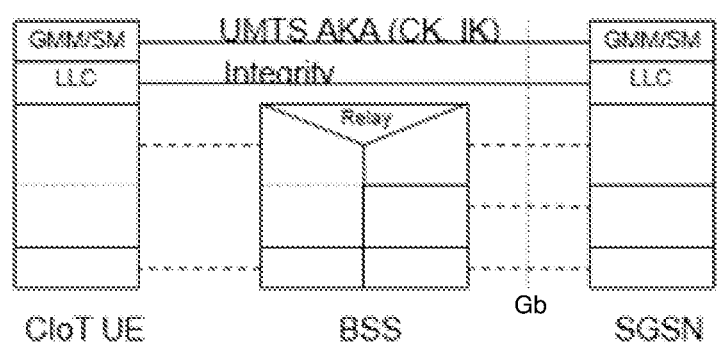
FIG. 4 illustrates protocols in use in the network of FIG. 1.

FIG. 4 illustrates a protocol layer control plane in Gb mode, that is, over the Gb interface.

As can be seen from this figure, the the Universal Mobile Telecommunications System (UMTS) Authentication and Key Agreement (AKA) is run at the GPRS Mobility Management and Session Management (GMM/SM) layer creating the keying material (CK, IK). The integrity protection is done at the Logical Link Control (LLC) layer using an integrity key that is created with the key derivation function from the UMTS AKA session keys.

Figure 5:
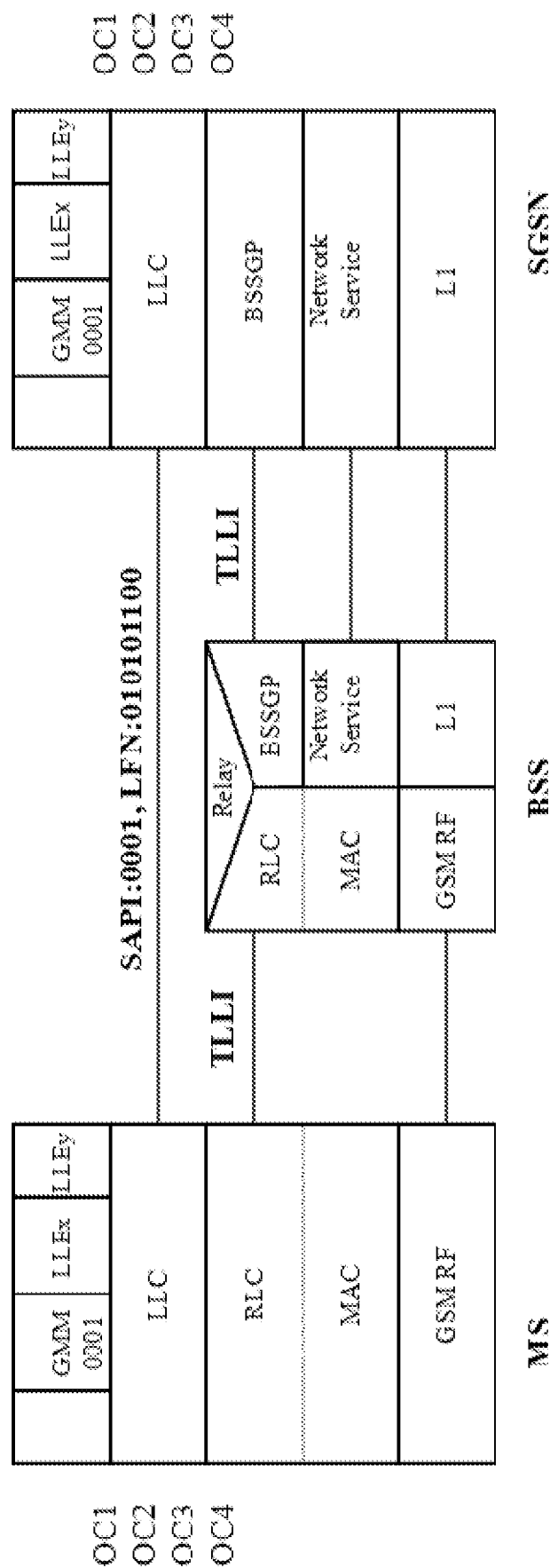
FIG. 5 illustrates protocols in use in the network of FIG. 1.

FIG. 5 illustrates how the LLC protocol identifies the messages sent between the MS and SGSN. There are several Logical Link Entities (LLE) above the LLC layer that have four bits long static identifiers called SAPIs (Service Access Point Identifiers). For example, the SAPI for GMM protocol is 0b0001. The MS is identified by a TLLI (Temporary Logical Link Identifier) that is transported at the lower layer, but controlled by the GMM protocol. TLLI is derived from the P-TMSI but it may also be a random number in some scenarios (e.g. when the MS has not been authenticated yet). SAPI and TLLI together form the identifier of data connection, i.e. a DLCI (Data Link Connection Identifier).

Each message sent within a DLCI has an incremental 9 bits long number called the LFN (LLC frame number). When the LFN flows over, the related 32 bits long overflow counter (OC) is incremented by one. The OC value is not sent within the messages but maintained in both the MS and the SGSN. There are four OC counters associated with each DLCI; two for unacknowledged information transfer (one for each direction of transmission), and two for acknowledged information transfer (one for each direction of transmission).

Figure 6:
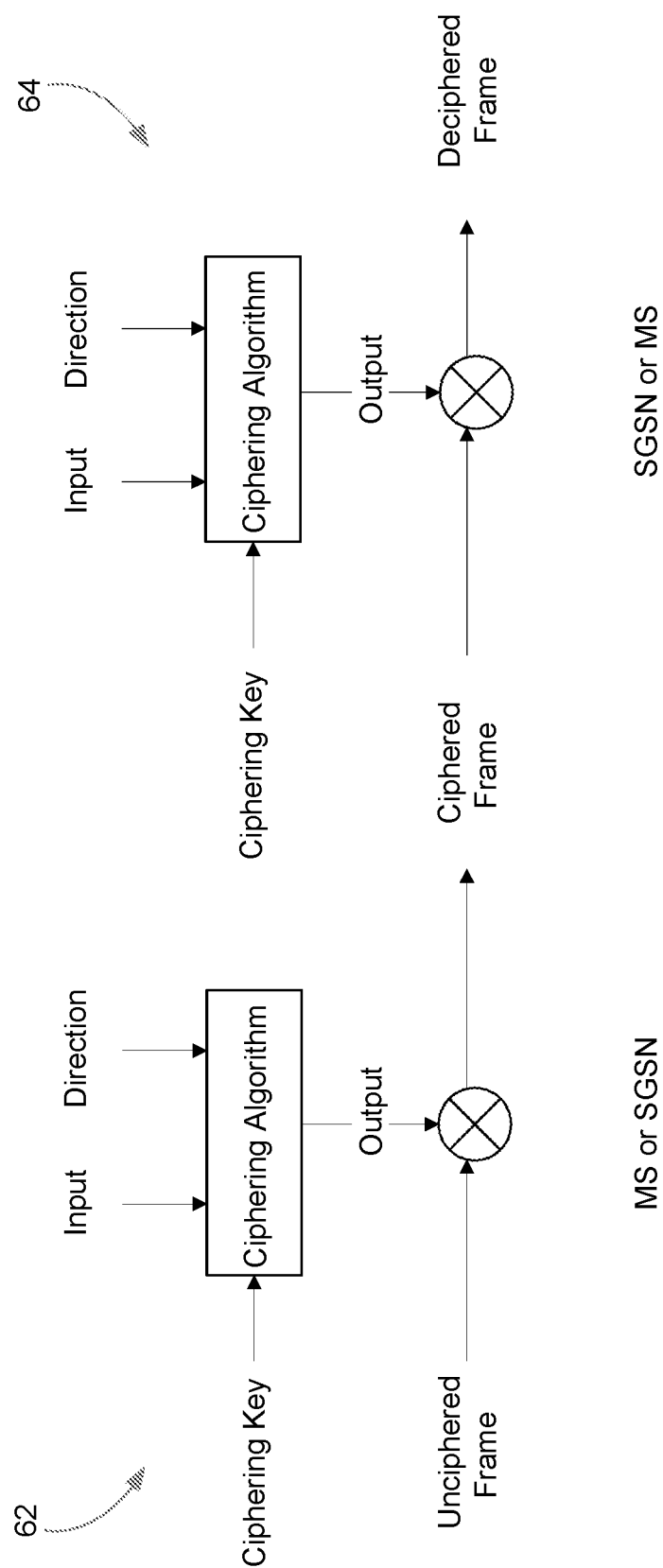
FIG. 6 illustrates the use of ciphering and deciphering in the network of FIG. 1.

FIG. 6 illustrates how the GPRS encryption algorithms use these parameters in the encryption and decryption process.

Specifically, at the transmission side 62, FIG. 6 shows the ciphering key (CK), a parameter indicating the transmission direction, and an input value, being applied to a ciphering algorithm to produce an output key stream. The key stream is then applied to an unciphered frame to produce a ciphered frame for transmission over a network.

At the reception side 64, FIG. 6 shows the ciphering key (CK), a parameter indicating the transmission direction, and an input value, being applied to a ciphering algorithm to produce an output key stream. The key stream is then applied to the ciphered frame that has been received over the network, in order to produce a deciphered frame.

The input value used by the ciphering algorithm is formed using the parameters mentioned with reference to FIG. 5.

More specifically, the Input parameter is modulo counter that is generated differently for unacknowledged information transfer (UI) and acknowledged information transfer (I) frames.

If the frame is a UI frame:
Input=((IOV-UI $\otimes$ SX)+LFN+OC) modulo $2^{32}$, and,
if the frame is an I frame:
Input=(IOV-I+LFN+OC) modulo $2^{32}$,
where, in each case:
IOV-UI is a 32 bit random value generated by the SGSN.
IOV-I is a 32 bit random value generated by the SGSN.
LFN is the LLC frame number in the LLC frame header.
  LFN is a binary value with a length of nine bits. For I frames, N(S) shall be used as the LFN. For UI frames, N(U) shall be used as the LFN.
OC is a binary overflow counter that is calculated and maintained independently at the sending and receiving sides. The length of OC is 32 bits. There are four OC counters associated with each DLCI; two for unacknowledged information transfer (one for each direction of transmission), and two for acknowledged information transfer (one for each direction of transmission). An OC for acknowledged operation shall be set to 0 whenever ABM operation is (re-)established for the corresponding DLCI. OC shall be incremented by 512 every time when the corresponding LFN rolls over, i.e., when LFN exhausts its modulo and restarts counting from 0, so that OC and LFN when added together is in effect a 32 bit modulo $2^{32}$ counter.
SX is a 32 bit SAPI XOR mask calculated as follows: SX=$2^{27}\times$SAPI+$2^{31}$.
+ is the binary addition operation.
$\otimes$ is the bitwise XOR operation (in this context, effectively a modulo $2^{32}$ integer addition).

As described in more detail below, the identifiers and counters that are already used for ciphering, are re-used for integrity protection. Also re-used are the per-message unique message counters that are independently maintained in the receiving side since otherwise, integrity protection would be vulnerable to replay attacks. However, there is thus no need to specify an additional counter value. In certain embodiments, this may have some of the advantages that: the changes to the LLC protocol when integrity protection is added are minimized, there is no need to carry a separate ciphering frame number and a separate integrity protection count number in the LLC messages, or there is no need to specify new procedures for negotiation or re-set of integrity protection counter.

Figure 7:
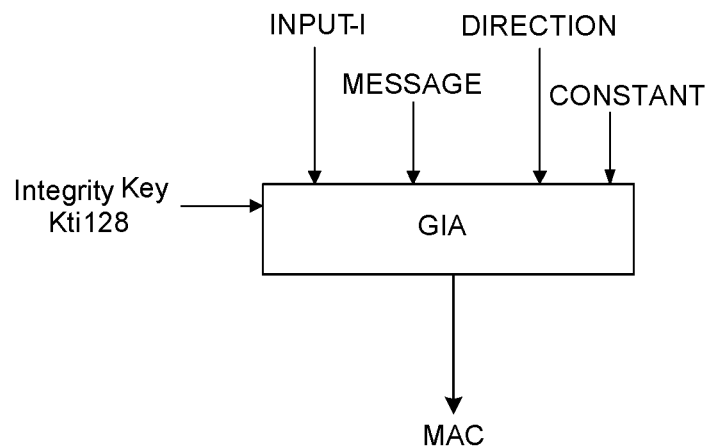
FIGS. 7 and 8 illustrate the use of integrity protection in the network of FIG. 1.

FIG. 7 illustrates a method comprising the generation of a Message Authentication Code (MAC) at a transmitter, which may be either a terminal device or a network node.

Specifically, FIG. 7 shows a GPRS integrity algorithm (GIA), which receives five input parameters. In one example, the first input parameter of the integrity algorithm is the integrity key (Kti128), which may be derived from the encryption and authentication keys, either in a terminal device or in a network node, by running the Universal Mobile Telecommunications System (UMTS) Authentication and Key Agreement (AKA), as described in the 3GPP Technical Report 3GPP TR 33.860 V0.4.0. In some embodiments, different integrity keys may be used for different frame types, for example a first integrity key (IK-I) for I-frames and a second integrity key (IK-UI) for UI-frames.

The second input parameter is a frame-dependent integrity input (Input-I), which is derived as described below.

The relevant frame of the message to be transmitted is also applied to the integrity algorithm (GIA) as a third input.

The fourth input parameter indicates the transfer direction (Direction).

A fifth input parameter is a constant value (Constant).

At the transmitter, the integrity algorithm produces the Message Authentication Code (MAC) as an output parameter. The MAC can then be transmitted with the message.

Figure 8:
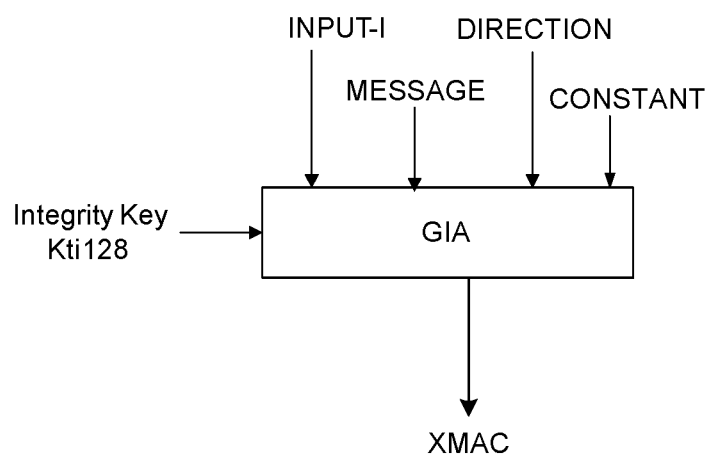

FIG. 8 illustrates a method comprising the generation of a Message Authentication Code (XMAC) at a receiver, which again may be either a terminal device or a network node.

Again, FIG. 8 shows the GPRS integrity algorithm (GIA) receiving five input parameters.

As in FIG. 7, the first input parameter of the integrity algorithm is the integrity key (Kti128), which may be derived from the encryption and authentication keys, either in a terminal device or in a network node, by running the Universal Mobile Telecommunications System (UMTS) Authentication and Key Agreement (AKA), as described in the 3GPP Technical Report 3GPP TR 33.860 V0.4.0. In some embodiments, different integrity keys may be used for different frame types, for example a first integrity key (IK-I) for I-frames and a second integrity key (IK-UI) for UI-frames.

The second input parameter is a frame-dependent integrity input (Input-I), which is derived as described below.

The relevant frame of the received message is also applied to the integrity algorithm (GIA) as a third input.

The fourth input parameter indicates the transfer direction (Direction).

A fifth input parameter is a constant value (Constant).

At the receiver, the integrity algorithm produces a Message Authentication Code (XMAC) as an output parameter. This can then be compared with the MAC that was received with the received message. If the calculated XMAC is the same as the received MAC, the integrity of the message can be assumed.

In both the transmitter and the receiver, that is in both FIG. 7 and FIG. 8, the frame-dependent integrity input (Input-I) can be generated according to the following algorithm:

If the frame is a UI frame:
Input-I=((integrity-IOV-UI $\otimes$ SX)+LFN+OC) modulo $2^{32}$.

If the frame is an I frame:
Input-I=(integrity-IOV-I+LFN+OC) modulo $2^{32}$.

where integrity-IOV-UI and integrity-IOV-I are 32 bit values that are effectively random values, and, in each case:

LFN is the LLC frame number in the LLC frame header. LFN is a binary value with a length of nine bits. For I frames, N(S) shall be used as the LFN. For UI frames, N(U) shall be used as the LFN.

OC is a binary overflow counter that is calculated and maintained independently at the sending and receiving sides. The length of OC is 32 bits. There are four OC counters associated with each DLCI; two for unacknowledged information transfer (one for each direction of transmission), and two for acknowledged information transfer (one for each direction of transmission). An OC for acknowledged operation shall be set to 0 whenever ABM operation is (re-)established for the corresponding DLCI. OC shall be incremented by 512 every time when the corresponding LFN rolls over, i.e., when LFN exhausts its modulo and restarts counting from 0, so that OC and LFN when added together is in effect a 32 bit modulo $2^{32}$ counter.

SX is a 32 bit SAPI XOR mask calculated as follows: SX=$2^{27}$×SAPI+$2^{31}$.

+ is the binary addition operation.

$\otimes$ is the bitwise XOR operation.

In some embodiments, integrity-IOV-UI and integrity-IOV-I are 32 bit random values.

For example, if it is determined that integrity protection is to be used, the SGSN may generate random numbers and assign them to the parameters integrity-IOV-UI and integrity-IOV-I. The SGSN uses these parameter values when it is applying the integrity algorithm. In addition, it sends the values of the parameters integrity-IOV-UI and integrity-IOV-I to the MS, for the MS to use when it is applying the integrity algorithm.

In some embodiments, integrity-IOV-UI is a 32 bit value calculated from the random value IOV-UI that is a generated by the SGSN for use in the ciphering algorithm, while integrity-IOV-I is a 32 bit value calculated from the random value IOV-I value that is generated by the SGSN for use in the ciphering algorithm.

As one example of this, the values for integrity-IOV-UI and integrity-IOV-I are calculated by SGSN and MS by using a cryptographic function, for example a key derivation function (KDF) (such as HMAC-SHA256 as in LTE, though other types of KDF are also possible, such as stream-ciphers or other keyed message authentication codes), and a static string. The values may then be truncated to any suitable predetermined length, for example with only the 32 most or least significant bits from the outcome being taken as the result, or may be used without truncation. Thus, in one example:

Integrity-IOV-UI=KDF(IOV-UI, static_string_1); where the static_string_1 could be "integrity", and Integrity-IOV-I=KDF(IOV-I, static_string); where the static_string could be "integrity".

As another example, the values for integrity-IOV-UI and integrity-IOV-I are calculated by SGSN and MS by using a bitwise XOR operation and a bit mask. Thus:

Integrity-IOV-IO-UI=(IOV-IO-UI $\otimes$ bitmask); where the bitmask could be generated by the binary shift operation (1<<31), and Integrity-IOV-I=(IOV-I $\otimes$ bitmask); where the bitmask could be generated by the binary shift operation (1<<31).

Thus, in these examples, the SGSN and the MS already know the values of IOV-UI and IOV-I value for use in the ciphering algorithm, and so they are able to derive the values for integrity-IOV-UI and integrity-IOV-I. Since IOV-UI and IOV-I are random values, then integrity-IOV-UI and integrity-IOV-I are effectively random values also.

The inclusion of the frame-specific sequence number LFN in the calculation of Input-I means that the value of the integrity input is frame-dependent. The frame-dependent values are associated with a protocol frame transporting the message.

Thus, the existing procedure for calculating the INPUT value for the ciphering algorithm is re-used for integrity protection, with differences between the ways in which the random numbers are created and shared between UE and SGSN.

In both the transmitter and the receiver, that is in both FIG. 7 and FIG. 8, the constant value (Constant) constant may be frame-type specific, for example:
Constant="UI-frame"; if the frame is a UI frame, or
Constant="I-frame"; if the frame is a I frame.

Alternatively, the constant may be both integrity algorithm-specific and frame-type specific, for example:
Constant="algorithm-X-UI-frame"; if the algorithm is X, and the frame is a UI frame,
Constant="algorithm-X-I-frame"; if the algorithm is X, and the frame is a I frame,
Constant="algorithm-Y-UI-frame"; if the algorithm is Y, and the frame is a UI frame, or
Constant="algorithm-Y-I-frame"; if the algorithm is Y, and the frame is a I frame.

Figure 9:
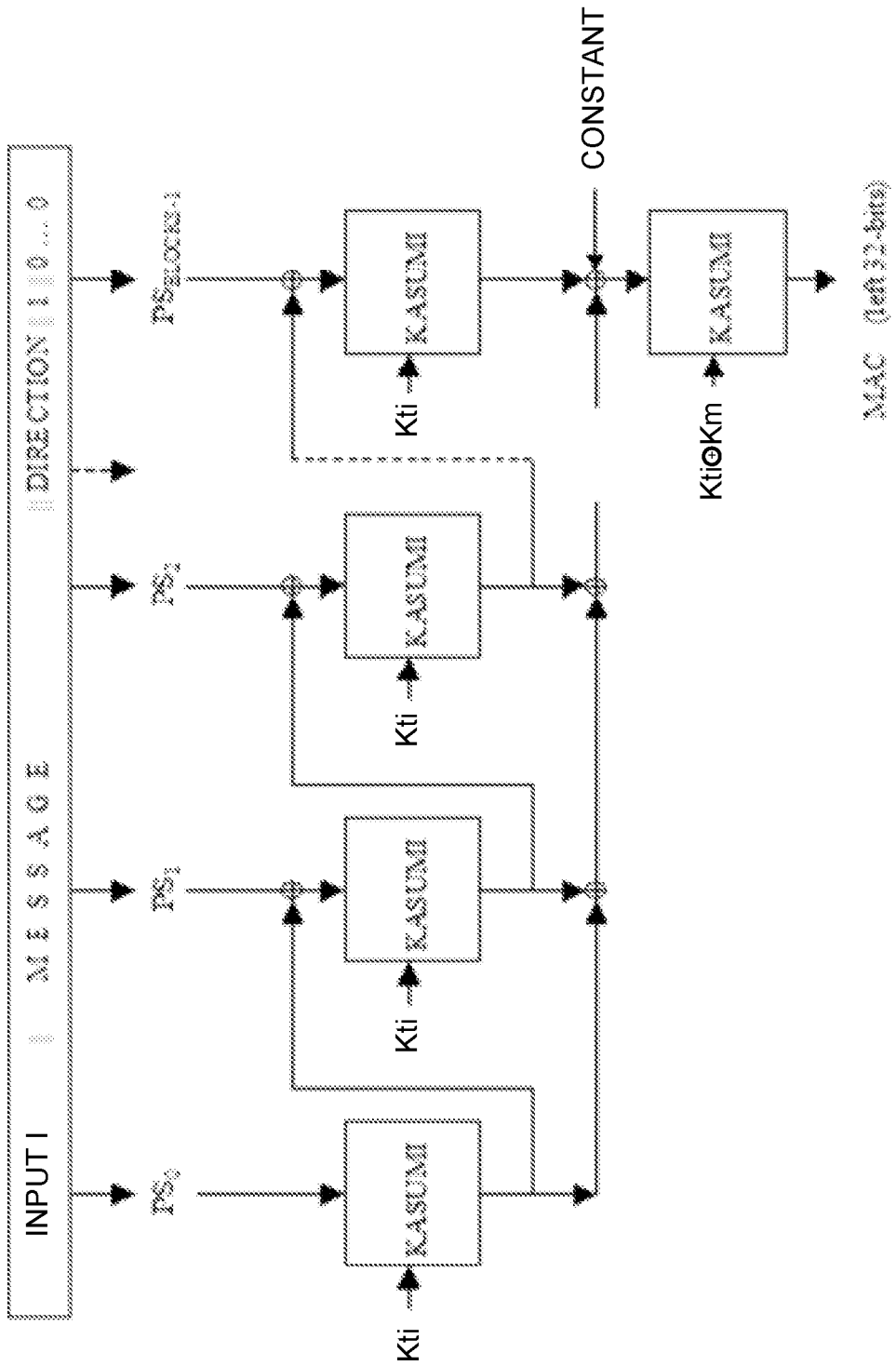
FIG. 9 illustrates a part of the integrity protection in FIGS. 7 and 8.

FIG. 9 illustrates one possible form of the integrity algorithm (GIA) shown in FIGS. 7 and 8. Specifically, FIG. 9 illustrates an example where the integrity algorithm is based on the Kasumi 128 block cipher. In other examples, the SNOW 3G, AES or ZUC cipher algorithms could be used.

Figure 10:
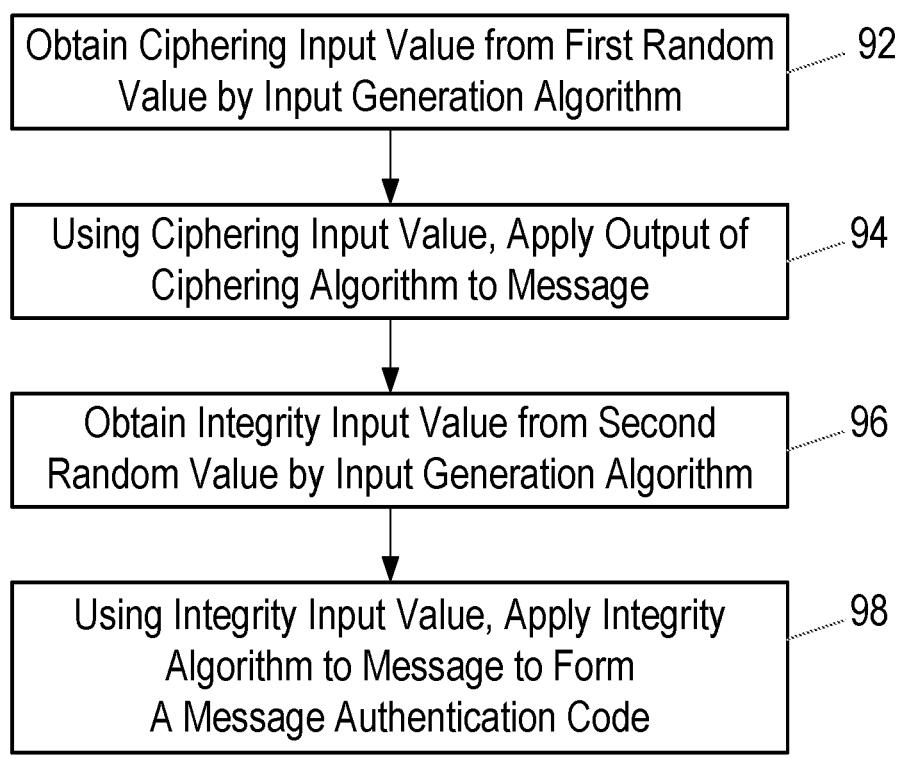
FIG. 10 is a flow chart illustrating a method.

FIG. 10 is a flow chart showing a method of operation of a transmitting device or node in a cellular communications network, in order to provide protection for a message transmitted and received over a communications network, according to embodiments. Thus, in step 92, the transmitting node obtains a ciphering input value from a first random value by means of an input generation algorithm. In step 94, the transmitting device or node applies an output of a ciphering algorithm to the message to be transmitted.

In step 96, the transmitting device or node obtains an integrity input value using the same input generation algorithm, but using a second random value. In some embodiments, the second random value is calculated from the first random value using a key derivation function. In some other embodiments, the second random value is calculated from the first random value using a bit mask and a bitwise XOR operation.

The integrity input may be a frame-dependent integrity input, comprising a frame-dependent modulo count value that also depends on the second random value.

In step 98, the transmitting device or node applies an integrity algorithm to the message to be transmitted, to form a message authentication code for the message. The message authentication code can then be transmitted with the message in order to provide integrity protection.

The integrity algorithm may further use an integrity key, and a value indicating a transfer direction.

The integrity algorithm may further use a constant value. In that case, the constant value may be specific to the frame type. The constant value may be specific to the frame type and to the integrity algorithm that is used. The constant value may indicate whether the frame is an unacknowledged information transfer type frame or an acknowledged information transfer type frame.

Figure 11:
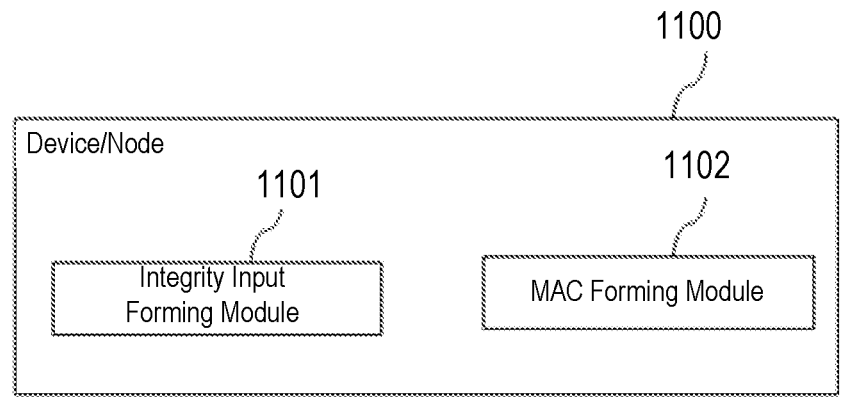
FIG. 11 illustrates a device or node in the network of FIG. 1.
Figure 12:
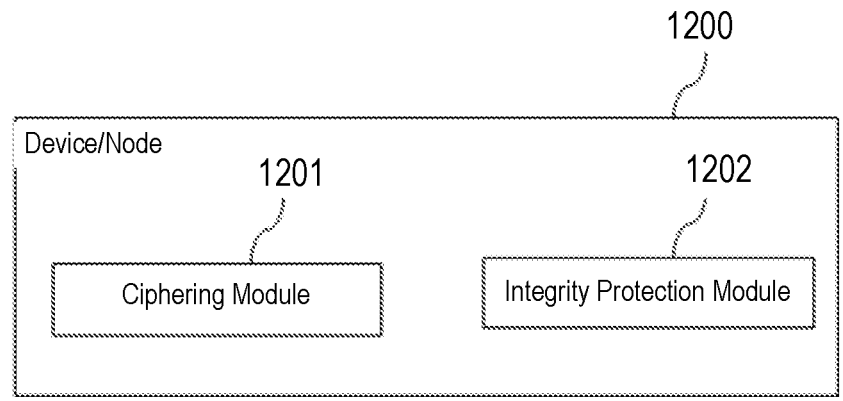
FIG. 12 illustrates a device or node in the network of FIG. 1.

FIGS. 11 and 12 illustrate functional units in other embodiments of devices or nodes 1100 and 1200, which may execute any of the methods described herein, for example according to computer readable instructions received from a computer program. It will be understood that the modules illustrated in FIGS. 11 and 12 are software implemented functional units, and may be realised in any appropriate combination of software modules.

Referring to FIG. 11, the device or node 1100 comprises an integrity input forming module 1101, for forming a frame-dependent integrity input, wherein the frame-dependent integrity input is a frame-dependent modulo count value that also depends on a random value and on a frame-specific sequence number. The device or node 1100 also comprises a message authentication code (MAC) forming module 1102, for forming a message authentication code for a message transmitted and received over a communications network, by applying inputs to an integrity algorithm acting on the message, wherein the inputs comprise: an integrity key; a value indicating a transfer direction; and the frame-dependent integrity input.

Referring to FIG. 12, the device or node 1200 comprises a ciphering module 1201, for applying an output of a ciphering algorithm to the message, wherein the ciphering algorithm uses a ciphering input value that is obtained from a first random value by means of an input generation algorithm. The device or node 1200 also comprises an integrity protection module 1202, for providing integrity protection by applying an integrity algorithm to the message to form a message authentication code for the message, wherein the integrity algorithm uses an integrity input value that is obtained from a second random value by means of said input generation algorithm.

Figure 13:
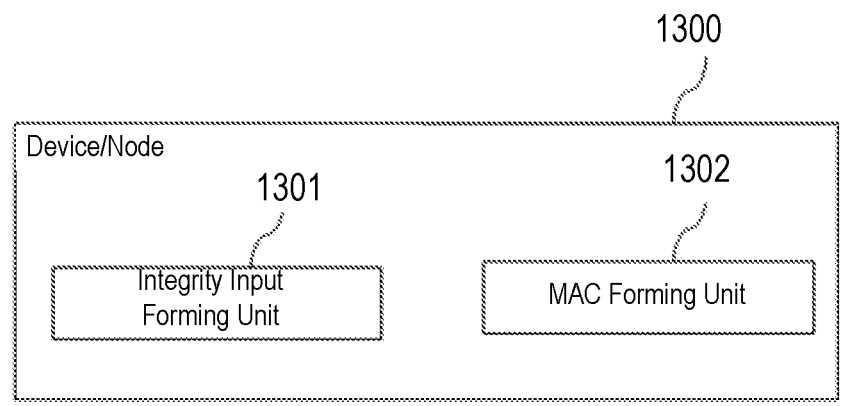
FIG. 13 illustrates a device or node in the network of FIG. 1.
Figure 14:
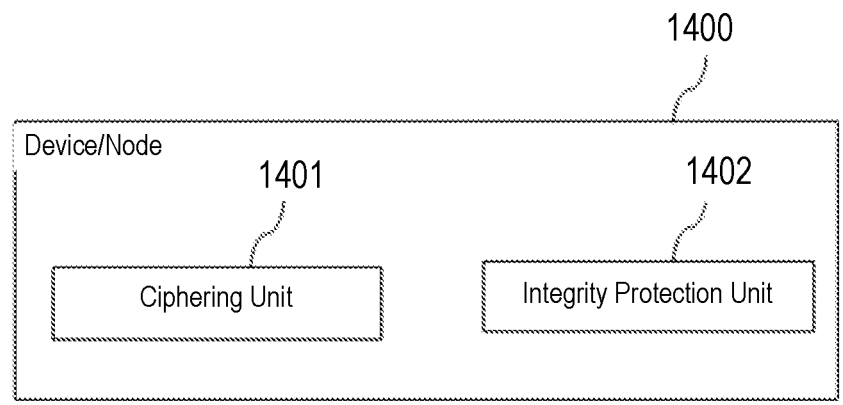
FIG. 14 illustrates a device or node in the network of FIG. 1.

FIGS. 13 and 14 illustrate functional units in other embodiments of devices or nodes 1300 and 1400, which may execute any of the methods described herein, for example according to computer readable instructions received from a computer program. It will be understood that the units illustrated in FIGS. 13 and 14 are hardware implemented functional units, and may be realised in any appropriate combination of hardware units.

Referring to FIG. 13, the device or node 1300 comprises an integrity input forming unit 1301, for forming a frame-dependent integrity input, wherein the frame-dependent integrity input is a frame-dependent modulo count value that also depends on a random value and on a frame-specific sequence number. The device or node 1300 also comprises a message authentication code (MAC) forming unit 1302, for forming a message authentication code for a message transmitted and received over a communications network, by applying inputs to an integrity algorithm acting on the message, wherein the inputs comprise: an integrity key; a value indicating a transfer direction; and the frame-dependent integrity input.

Referring to FIG. 14, the device or node 1400 comprises a ciphering unit 1401, for applying an output of a ciphering algorithm to the message, wherein the ciphering algorithm uses a ciphering input value that is obtained from a first random value by means of an input generation algorithm. The device or node 1400 also comprises an integrity protection module 1402, for providing integrity protection by applying an integrity algorithm to the message to form a message authentication code for the message, wherein the integrity algorithm uses an integrity input value that is obtained from a second random value by means of said input generation algorithm.

Figure 15:
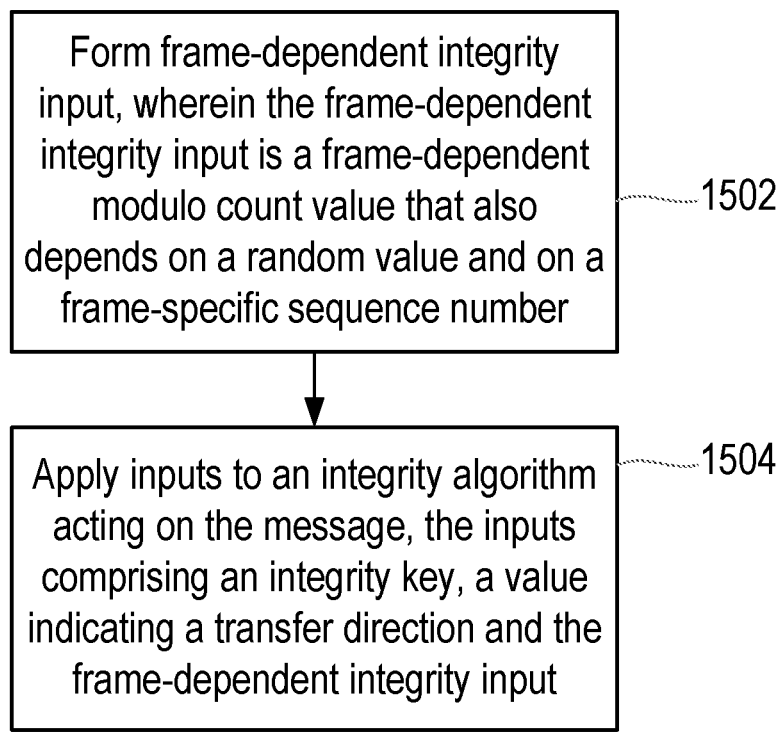
FIG. 15 is a flow chart illustrating a method.

FIG. 15 is a flow chart illustrating a method of forming a message authentication code for a message transmitted and received over a communications network. In step 1502, a frame-dependent integrity input is formed, wherein the frame-dependent integrity input is a frame-dependent modulo count value that also depends on a random value and on a frame-specific sequence number.

The frame-dependent value may be associated with a protocol frame transporting the message.

The method may also comprise calculating the random value from a second random value using a cryptographic function, for example a key derivation function. The method may comprise calculating the random value from a second random value using a bit mask and a bitwise XOR operation. In either case, the second random value may be a random value used for generating an input to a ciphering algorithm.

When the method is performed in a UE, the random value may be received from a node of the communications network, for example a SGSN.

When the method is performed in a node of the communications network, for example a SGSN, the method may comprise generating the random value and transmitting the random value to a UE.

The frame-specific sequence number may be a sequence number used for generating an input to a ciphering algorithm.

In step 1504, inputs are applied to an integrity algorithm acting on the message, the inputs comprising an integrity key, a value indicating a transfer direction and the frame-dependent integrity input.

The inputs to the integrity algorithm may further comprise a constant value. In that case, the constant value is specific to the frame type. The constant value may be specific to the frame type and to the integrity algorithm that is used. The constant value may indicate whether the frame is an unacknowledged information transfer type frame or an acknowledged information transfer type frame.

When the method is performed in a transmitter, and the message is a message to be transmitted over the communications network, the method may further comprise transmitting the message authentication code over the communications network.

When the method is performed in a receiver, and the message is a message received over the communications network, the method may further comprise obtaining a received message authentication code and comparing said message authentication code with the received message authentication code.

There are thus described methods of operation of a terminal device and a network node that allow for improved security.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A user equipment, (UE), the UE being configured to provide integrity protection for a message, the UE comprising:
    a processor; and
    a memory, wherein the UE is configured to:
    obtain inputs, the inputs comprising: i) an integrity key, ii) a transfer direction value indicating a transfer direction, iii) a frame-dependent integrity input, wherein the frame-dependent integrity input is a frame-dependent modulo count value that depends on a random value and on a frame-specific sequence number;
    obtain the message; and
    generate a message authentication code (MAC) for the message by applying the obtained inputs and the message to an integrity algorithm.

2. The UE of claim 1, wherein the UE is configured to calculate the random value from a second random value using a cryptographic function.

3. The UE of claim 1, wherein the UE is configured to calculate the random value from a second random value using a bit mask and a bitwise XOR operation.

4. The UE of claim 1, further comprising a receiver for receiving the random value from a node of the communications network.

5. The UE of claim 4, wherein the node of the communications network is a Serving GPRS Support Node (SGSN).

6. The UE of claim 1, wherein the obtained inputs further comprise a constant value.

7. The UE of claim 6, wherein the UE is configured to obtain the constant value using a frametype value indicating a frame type.

8. The UE of claim 7, wherein
    the frame-dependent modulo count value depends on: i) the random value, ii) the frame-specific sequence number, and iii) a binary overflow counter (OC), and
    the binary overflow counter (OC) and the constant are separate values.

9. The UE of claim 1, wherein the frame-specific sequence number is associated with a protocol frame transporting the message.

10. The UE of claim 1, wherein the frame-dependent integrity input is not dependent on the constant that was obtained using the frametype value indicating the frame type.

11. A method for providing integrity protection for a message, the method comprising:
    obtaining inputs, the inputs comprising: i) an integrity key, ii) a transfer direction value indicating a transfer direction, iii) a frame-dependent integrity input, wherein the frame-dependent integrity input is a frame-dependent modulo count value that depends on a random value and on a frame-specific sequence number;
    obtaining the message; and
    generating a message authentication code (MAC) for the message by applying the obtained inputs and the message to an integrity algorithm.

12. The method of claim 11, further comprising calculating the random value from a second random value using a cryptographic function.

13. The method of claim 11, further comprising calculating the random value from a second random value using a bit mask and a bitwise XOR operation.

14. The method of claim 11, further comprising receiving the random value from a node of the communications network.

15. The method of claim 14, wherein the node of the communications network is a Serving GPRS Support Node (SGSN).

16. The method of claim 11, wherein the obtained inputs further comprise a constant value.

17. The method of claim 16, wherein the constant value is obtained using a frametype value indicating a frame type.

18. The method of claim 17, wherein
the frame-dependent modulo count value depends on: i) the random value, ii) the frame-specific sequence number, and iii) a binary overflow counter (OC), and
the binary overflow counter (OC) and the constant are separate values.

19. The method of claim 11, wherein the frame-specific sequence number is associated with a protocol frame transporting the message.

20. The method of claim 11, wherein the frame-dependent integrity input is not dependent on the constant that was obtained using the frametype value indicating the frame type.

21. The method of claim 11, wherein
the method is performed in a transmitter,
the message is a message to be transmitted over a communications network, and
the method further comprises transmitting the message authentication code over the communications network.

22. The method of claim 11, wherein
the method is performed in a receiver,
the message is a message received over a communications network, and
the method further comprises obtaining a received message authentication code and comparing said message authentication code with the received message authentication code.

23. A non-transitory computer readable medium storing a computer program configured, when run on a computer, to cause the computer to perform the method of claim 11.

24. A node for use in a communications network, the node being configured to provide integrity protection for a message, the node comprising:
a processor; and
a memory, wherein the node is configured to:
obtain inputs, the inputs comprising: an integrity key, a transfer direction value indicating a transfer direction, and a frame-dependent integrity input, wherein the frame-dependent integrity input is a frame-dependent modulo count value that also depends on a random value and on a frame-specific sequence number;
obtain the message;
use the obtained inputs and the message to generate a message authentication code (MAC) for the message; and
transmit the message and the MAC, wherein the MAC enables a receiver of the message and the MAC to verify the integrity of the message.

25. The node of claim 24, wherein
the node is further configured to generate the random value, and
the node further comprises a transmitter for transmitting the random value to a user equipment (UE).

* * * * *

UNITED STATES PATENT AND TRADEMARK OFFICE
CERTIFICATE OF CORRECTION

PATENT NO. : 11,917,073 B2
APPLICATION NO. : 17/706774
DATED : February 27, 2024
INVENTOR(S) : Torvinen et al.

It is certified that error appears in the above-identified patent and that said Letters Patent is hereby corrected as shown below:

On the Title Page

In Item (72), under "INVENTORS", in Column 1, Line 8, delete "Sätila (SE)" and insert -- Lund (SE) --, therefor.

On Page 2, in Item (56), under "OTHER PUBLICATIONS", in Column 2, Line 23, delete "V1.0.0 ," and insert -- V1.0.0, --, therefor.

In the Specification

In Column 1, Line 7, delete "2018," and insert -- 2018, now U.S. Pat. No. 11,296,890, --, therefor.

In Column 3, Lines 63-64, delete "base band" and insert -- baseband --, therefor.

In Column 3, Line 66, delete "basestation" and insert -- base station --, therefor.

In Column 4, Line 3, delete "basestations," and insert -- base stations, --, therefor.

In Column 4, Line 35, delete "basestations" and insert -- base stations --, therefor.

In Column 5, Line 38, delete "the the" and insert -- the --, therefor.

In Column 7, Line 20, delete "integrity" and insert -- GPRS integrity --, therefor.

In Column 7, Line 47, delete "integrity" and insert -- GPRS integrity --, therefor.

In Column 8, Line 34, delete "a generated" and insert -- generated --, therefor.

In Column 9, Line 26, delete "integrity" and insert -- GPRS integrity --, therefor.

Signed and Sealed this
Twenty-ninth Day of October, 2024

Katherine Kelly Vidal
*Director of the United States Patent and Trademark Office*

In Column 10, Line 59, delete "module 1402," and insert -- unit 1402, --, therefor.

In the Claims

In Column 1, Line 60, in Claim 1, delete "equipment, (UE)," and insert -- equipment (UE), --, therefor.